(12) United States Patent
Fang et al.

(10) Patent No.: US 10,853,615 B2
(45) Date of Patent: Dec. 1, 2020

(54) FINGERPRINT IDENTIFICATION SYSTEM AND ELECTRONIC DEVICE

(71) Applicant: SHENZHEN GOODIX TECHNOLOGY CO., LTD., Guangdong (CN)

(72) Inventors: Hsin-Wen Fang, Taipei (TW); Kuo-Hao Chao, Taipei (TW)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 105 days.

(21) Appl. No.: 16/130,665

(22) Filed: Sep. 13, 2018

(65) Prior Publication Data
US 2019/0012506 A1 Jan. 10, 2019

Related U.S. Application Data

(63) Continuation of application No. PCT/CN2017/072527, filed on Jan. 24, 2017.

(51) Int. Cl.
*G06K 9/00* (2006.01)
*G06K 9/03* (2006.01)
(Continued)

(52) U.S. Cl.
CPC ......... *G06K 9/0002* (2013.01); *G06F 3/0416* (2013.01); *G06K 9/03* (2013.01); *G06F 21/32* (2013.01)

(58) Field of Classification Search
CPC .............. G06K 9/0002; G06K 9/00053; H01L 27/0248; H01L 27/0255; G06F 3/044
See application file for complete search history.

(56) References Cited

U.S. PATENT DOCUMENTS

2005/0253598 A1* 11/2005 Kawahata ............ G06K 9/0002
324/671
2008/0122454 A1* 5/2008 Kato ...................... G01D 3/032
324/661
(Continued)

FOREIGN PATENT DOCUMENTS

CN 102004903 4/2011
CN 102750057 A 10/2012
(Continued)

OTHER PUBLICATIONS

Search Report dated Feb. 20, 2019 by the European Patent Office for counterpart application No. 17894615.8.
(Continued)

*Primary Examiner* — Yuzhen Shen
(74) *Attorney, Agent, or Firm* — WPAT, P.C., Intellectual Property Attorneys; Anthony King

(57) ABSTRACT

A fingerprint identification system is provided, which includes: a plurality of first pixel circuits; a first sensing circuit for outputting a first output signal; at least one second pixel circuit; a second sensing circuit for outputting a second output signal, wherein the second sensing circuit includes a second integration circuit having a second integral input terminal; a second calibration circuit coupled to the second integral input terminal; a third calibration circuit coupled to the second integral input terminal, wherein the second calibration circuit and the third calibration circuit are used for calibrating the second output signal; and a differential amplifier circuit coupled to the first sensing circuit and the second sensing circuit and used for generating an amplified output signal.

20 Claims, 4 Drawing Sheets

(51) Int. Cl.
*G06F 3/041* (2006.01)
*G06F 21/32* (2013.01)

(56) References Cited

U.S. PATENT DOCUMENTS

| | | |
|---|---|---|
| 2008/0317300 A1 | 12/2008 | Pai et al. |
| 2011/0248723 A1 | 10/2011 | Yeh et al. |
| 2013/0294662 A1 | 11/2013 | Franza et al. |
| 2015/0193042 A1 | 7/2015 | Jo et al. |
| 2016/0188949 A1* | 6/2016 | Yang ............... G06K 9/0002 382/124 |
| 2016/0239700 A1* | 8/2016 | Yang ............... G06K 9/0002 |
| 2016/0275333 A1* | 9/2016 | Lin ................. G06K 9/0002 |
| 2016/0307019 A1 | 10/2016 | Zhang et al. |
| 2016/0314334 A1 | 10/2016 | He et al. |
| 2016/0350577 A1 | 12/2016 | Yang et al. |
| 2018/0025203 A1* | 1/2018 | Lee ................. H01L 27/1214 382/124 |

FOREIGN PATENT DOCUMENTS

| | | |
|---|---|---|
| CN | 105046247 A | 11/2015 |
| CN | 105335715 | 2/2016 |
| CN | 105426865 A | 3/2016 |
| CN | 106156741 A | 11/2016 |
| CN | 106203366 | 12/2016 |
| CN | 205862342 U | 1/2017 |
| JP | 2000213908 A | 8/2000 |
| KR | 20170003980 A | 1/2017 |
| WO | WO2003006925 A1 | 1/2003 |

OTHER PUBLICATIONS

English Abstract Translation of Foreign Document No. KR20170003980A.
English abstract translation of CN105335715.
English abstract translation of CN102004903.
English abstract translation of CN106203366.
International Search Report of PCT/CN2017/072527.
English International Search Report of PCT/CN2017/072527.
Written Opinion of PCT/CN2017/072527.
Office Action and Search Report dated Jun. 5, 2019 issued by Chinese International Patent Office for counterpart application No. 201780000068.1.
English Abstract of Foreign Document No. CN102750057A.
English Abstract of Foreign Document No. CN105046247A.
English Abstract of Foreign Document No. CN105426865A.
English Abstract of Foreign Document No. CN106156741A.
English Abstract of Foreign Document No. CN205862342U.
English Abstract of Foreign Document No. JP2000213908A.

* cited by examiner

FINGERPRINT IDENTIFICATION SYSTEM AND ELECTRONIC DEVICE

CROSS-REFERENCE TO RELATED APPLICATION

This application claims is a continuation of international application PCT/CN2017/072527, filed on Jan. 24, 2017, which is incorporated by reference in its entirety.

FIELD

The present disclosure relates to a fingerprint identification system, and an electronic device; in particular, the disclosure relates to a fingerprint identification system and an electronic device that are capable of reducing the influence of parasitic capacitance.

BACKGROUND

With the rapid development in science and technology, more and more portable electronic devices such as mobile phones, digital cameras, tablet computers, and notebook computers or the like have become essential tools in people's lives. Since portable electronic devices are generally used by individuals and have certain privacy, data stored inside the electronic devices (such as phone books, photos, personal information) is privately owned. Once the electronic device is lost, the data may be used by others, causing unnecessary losses. Although password protection has been used to prevent the electronic device from being used by others, passwords may be easily leaked or cracked, thus having a low degree of security. Moreover, the user has to remember the passwords so that the electronic device can be used. If the passwords are forgotten, a lot of inconveniences are brought to the user. Therefore, a personal fingerprint identification system has been developed for the purpose of identity verification so as to improve data security.

In the prior art, a capacitive fingerprint identification system is a very popular method for identifying a fingerprint, in which a contact layer is used for receiving finger contact from a user and the capacitance variation of the contact layer is sensed to identify a finger ridge or a finger valley of the user's fingerprint. In order to prevent the contact layer from being interfered by other circuits, a shielding layer is generally arranged under the contact layer in the circuit layout in the prior art for the purpose of generating a shielding effect and preventing the circuits under the shielding layer from interfering with the contact layer. However, a parasitic capacitance may be generated between the contact layer and the shielding layer, and the capacitance value of the parasitic capacitance is usually greater than that of the contact capacitance generated due to the contact, thus having an influence on the capacitive sensing circuit or the capacitive fingerprint identification system in determining the capacitance value of the contact capacitance, and further reducing the accuracy of fingerprint identification.

SUMMARY OF THE INVENTION

Therefore, a main object of some embodiments of the present disclosure is to provide a fingerprint identification system and an electronic device, which are capable of reducing the influence of parasitic capacitance and reducing the sensitivity to temperature and noise.

In order to solve the above issues, the present disclosure provides a fingerprint identification system, including: a plurality of first pixel circuits, one of the plurality of first pixel circuits and a finger form a contact capacitance; a first sensing circuit, coupled to the first pixel circuit, the first sensing circuit being used for sensing the contact capacitance and outputting a first output signal, wherein the first sensing circuit includes: a first integration circuit, having a first integral input terminal; and a first calibration circuit, coupled to the first integral input terminal, the first calibration circuit being used for calibrating the first output signal; at least one second pixel circuit; a second sensing circuit, coupled to one of the at least one second pixel circuit, the second sensing circuit being used for outputting a second output signal, wherein the second sensing circuit includes: a second integration circuit, having a second integral input terminal; a second calibration circuit, coupled to the second integral input terminal; and a third calibration circuit, coupled to the second integral input terminal, wherein the second calibration circuit and the third calibration circuit are used for calibrating the second output signal; and a differential amplifier circuit, coupled to the first sensing circuit and the second sensing circuit, the differential amplifier circuit being used for amplifying a difference between the first output signal and the second output signal to generate an amplified output signal.

For instance, the first calibration circuit includes: a first calibration capacitor, coupled to the first integral input terminal; a first calibration switch, one terminal of the first calibration switch being coupled to the first calibration capacitor, and another terminal of the first calibration switch being coupled to a positive voltage; and a second calibration switch, one terminal of the second calibration switch being coupled to the first calibration capacitor, and another terminal of the second calibration switch being for receiving a first calibration voltage.

For instance, the second calibration circuit includes: a second calibration capacitor, coupled to the second integral input terminal; a third calibration switch, one terminal of the third calibration switch being coupled to the second calibration capacitor, and another terminal of the third calibration switch being coupled to the positive voltage; and a fourth calibration switch, one terminal of the fourth calibration switch being coupled to the second calibration capacitor, and another terminal of the fourth calibration switch being for receiving the first calibration voltage.

For instance, the third calibration circuit includes: a third calibration capacitor, coupled to the second integral input terminal; a fifth calibration switch, one terminal of the fifth calibration switch being coupled to the third calibration capacitor, and another terminal of the fifth calibration switch being coupled to the positive voltage; and a sixth calibration switch, one terminal of the sixth calibration switch being coupled to the third calibration capacitor, and another terminal of the sixth calibration switch being for receiving a second calibration voltage.

For instance, capacitance of the second calibration capacitor is greater than capacitance of the third calibration capacitor.

For instance, the capacitance of the second calibration capacitor is 25 times the capacitance of the third calibration capacitor.

For instance, the fingerprint identification system further includes: a calibration voltage generation circuit, coupled to the differential amplifier circuit, the first sensing circuit and the second sensing circuit, the calibration voltage generation circuit being used for generating the first calibration voltage and the second calibration voltage based on the amplified output signal.

For instance, the first integration circuit includes: a first amplifier, coupled to the first integral input terminal; and a first integration capacitor, coupled between the first integral input terminal and a first output terminal of the first amplifier.

For instance, the second integration circuit includes: a second amplifier, coupled to the second integral input terminal; and a second integration capacitor, coupled between the second integral input terminal and a second output terminal of the second amplifier.

For instance, the first output signal includes a first calibration amount due to the first calibration circuit, the second output signal includes a second calibration amount due to the second calibration circuit, the second output signal includes a third calibration amount due to the third calibration circuit, and the second calibration amount is greater than the third calibration amount.

The present disclosure further provides an electronic device, including: an operating circuit; and a fingerprint identification system, including: a plurality of first pixel circuits, one of the plurality of first pixel circuits and a finger form a contact capacitance; a first sensing circuit, coupled to the first pixel circuit, the first sensing circuit being used for sensing the contact capacitance and outputting a first output signal, wherein the first sensing circuit includes: a first integration circuit, having a first integral input terminal; and a first calibration circuit, coupled to the first integral input terminal, the first calibration circuit being used for calibrating the first output signal; at least one second pixel circuit; a second sensing circuit, coupled to one of the at least one second pixel circuit, the second sensing circuit being used for outputting a second output signal, wherein the second sensing circuit includes: a second integration circuit, having a second integral input terminal; a second calibration circuit, coupled to the second integral input terminal; and a third calibration circuit, coupled to the second integral input terminal, wherein the second calibration circuit and the third calibration circuit are used for calibrating the second output signal; and a differential amplifier circuit, coupled to the first sensing circuit and the second sensing circuit, the differential amplifier circuit being used for amplifying a difference between the first output signal and the second output signal to generate an amplified output signal.

A fingerprint identification system and an electronic device are further provided according to the present disclosure, in which a dummy pixel circuit is used to generate a dummy output signal to eliminate the effect of parasitic capacitance, with the purpose of improving the accuracy and efficacy of capacitance sensing or fingerprint identification.

BRIEF DESCRIPTION OF THE DRAWINGS

One or more embodiments are exemplarily illustrated in combination with the respective figures in the accompanying drawings, and the exemplary illustration should not be construed as limiting the embodiments. Elements having the same reference numerals in the drawings are similar elements, unless specifically stated otherwise, and the figures in the accompanying drawings are not drawn to scale.

DETAILED DESCRIPTION OF THE
EMBODIMENT(S) OF THE INVENTION

In order to make the objects, technical solutions and advantages of the disclosure clearer and more apparent, the disclosure will be further described below in detail with reference to the embodiments and the accompanying drawings. It should be noted that the specific embodiments described herein are merely used to explain the disclosure, and are not intended to limit the disclosure.

In the conventional fingerprint identification system, the output signal of the pixel circuit is influenced by the parasitic capacitances inside the pixel circuit and the sensing circuit, and therefore the signal component of the output signal of the pixel circuit which is associated with the variation of the contact capacitance is not significant. The output signal of the pixel circuit is also influenced by temperature and noise, thus reducing the accuracy of fingerprint identification. Therefore, in addition to the normal pixel circuit, the fingerprint identification system according to the present disclosure further includes a dummy pixel circuit, and a dummy output signal is generated by the dummy pixel circuit to counteract signal components in the output signals of the plurality of normal pixel circuits which are influenced by the parasitic capacitance, temperature and noise. The amplification and subsequent signal processing are performed on the fingerprint signal components in the output signals of the plurality of normal pixel circuits to determine whether the fingerprint is a finger ridge or a finger valley, thereby increasing the accuracy of fingerprint identification.

In addition, since it is difficult for the driving circuit in the normal pixel circuit to be completely identical to the driving circuit in the dummy pixel circuit in circuit implementation, the dummy output signal is brought into a saturation state or the differential amplifier (which is coupled to the normal pixel circuit and the dummy pixel circuit) is brought into a saturation state. Therefore, according to the present disclosure, two calibration circuits included in the dummy sensing circuit are used for calibrating the dummy output signal so that the dummy output signal is within a certain range, thus preventing the dummy output signal or the differential amplifier from entering the saturation state.

Figure 1:
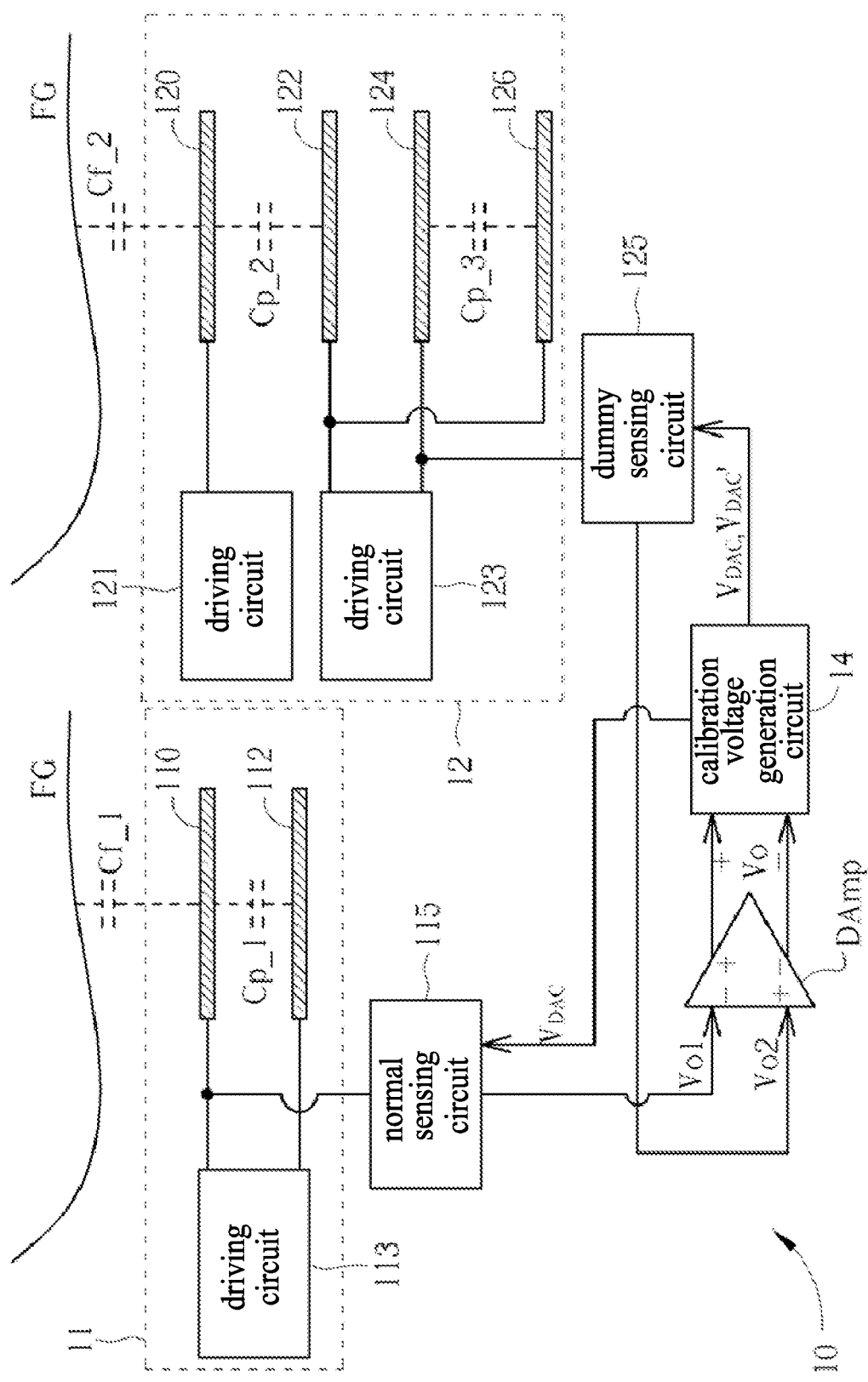
FIG. 1 is a schematic diagram of a fingerprint identification system according to an embodiment of the present disclosure.
Figure 2:
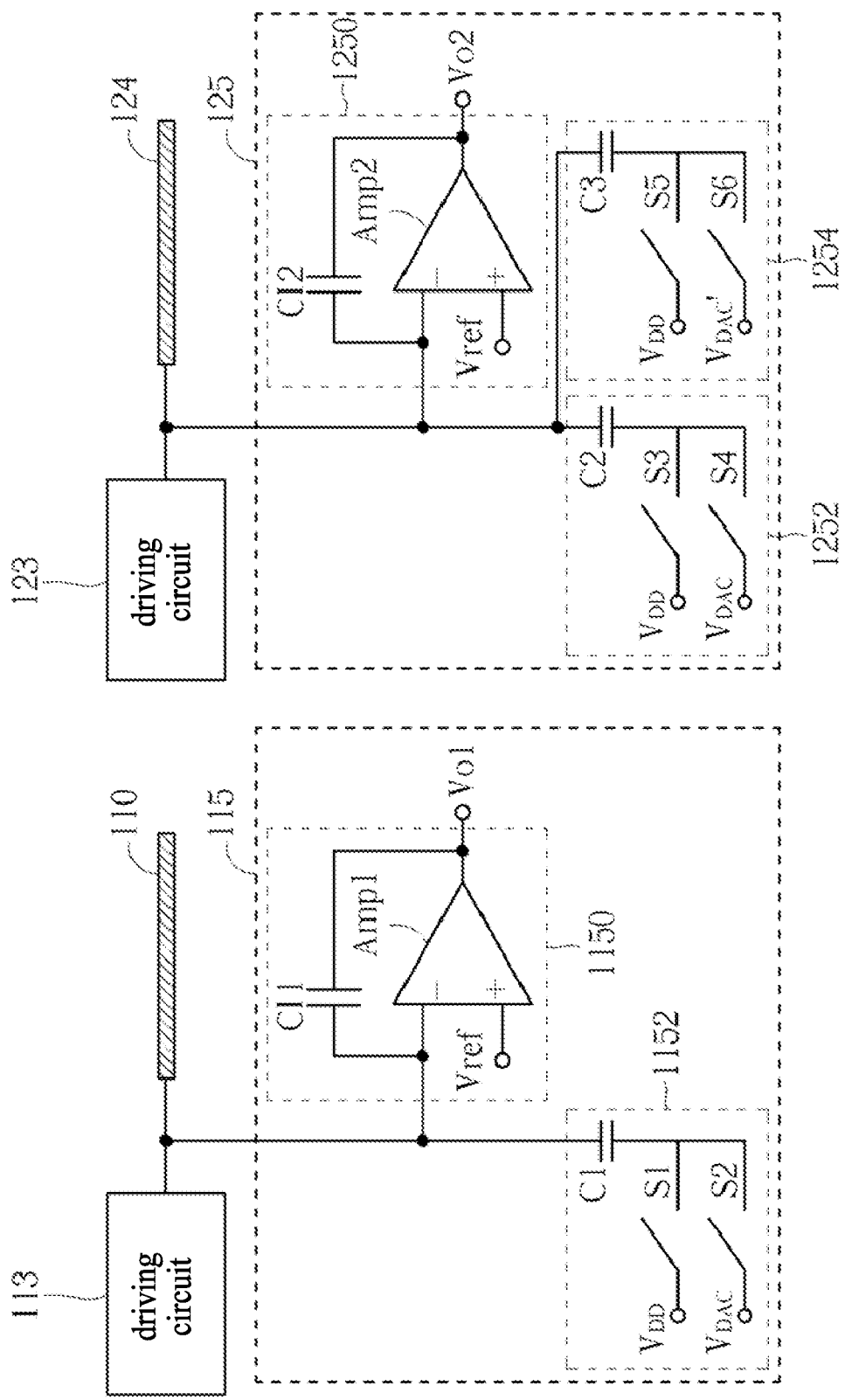
FIG. 2 is a schematic diagram of a normal sensing circuit and a dummy sensing circuit according to an embodiment of the present disclosure.

To elaborate, reference is made to FIG. 1 and FIG. 2, in which FIG. 1 is a schematic diagram of a fingerprint identification system according to an embodiment of the present disclosure, and FIG. 2 is a schematic diagram of a normal sensing circuit 115 and a dummy sensing circuit 125 according to an embodiment of the present disclosure. For the sake of convenience, FIG. 1 shows a schematic diagram of one of a plurality of normal pixel circuits and a dummy pixel circuit in the fingerprint identification system 10. As shown in FIG. 1, the fingerprint identification system 10 includes a normal pixel circuit 11, a dummy pixel circuit 12, a normal sensing circuit 115, a dummy sensing circuit 125 and a differential amplifier circuit DAmp. The normal sensing circuit 115 is coupled to the normal pixel circuit 11, and is used for outputting a normal output signal Vo1 to the differential amplifier circuit DAmp. In addition, the dummy sensing circuit 125 is coupled to the dummy pixel circuit 12, and is used for outputting a dummy output signal Vo2 to the differential amplifier circuit DAmp. The differential amplifier circuit DAmp is used for amplifying a difference (Vo1−Vo2) between the normal output signal Vo1 and the dummy output signal Vo2 so as to generate an amplified output signal Vo.

In addition, both the normal pixel circuit 11 and the dummy pixel circuit 12 can receive the contact of a finger FG, and form a contact capacitance Cf_1 and a contact capacitance Cf_2 respectively with the finger FG. The normal sensing circuit 115 may sense the contact capacitance Cf_1 and output the normal output signal Vo1. In addition, the second sensing circuit 125 is coupled to the dummy pixel circuit 12 and used for outputting the dummy output signal Vo2. The normal output signal Vo1 includes a large signal component $\overline{v_{o1}}$ and a small signal component ΔVo1 (that is, the normal output signal Vo1 may be expressed as Vo1=$\overline{v_{o1}}$+ΔVo1). The large signal component $\overline{v_{o1}}$ may be an average value of the normal output signal Vo1, and the small signal component ΔVo1 is related to a variation value ΔCf_1 of the contact capacitance Cf_1, which is a fingerprint signal for fingerprint identification. It should be noted that the dummy pixel circuit 12 may be appropriately designed such that the dummy output signal Vo2 is equal to the large signal component $\overline{v_{o1}}$ of the normal output signal Vo1 (that is, the dummy output signal Vo2 may be expressed as Vo2=$\overline{v_{o1}}$). In an embodiment, the differential amplifier circuit DAmp may be a programmable gain amplifier (PGA). The differential amplifier circuit DAmp may be coupled to an analog-to-digital converter (ADC) and a back-end circuit (not shown in FIG. 1) so that the subsequent signal processing is performed on the amplified output signal Vo and it is determined whether the normal pixel circuit 11 corresponds to a finger ridge or a finger valley of the finger FG.

In other words, the normal output signal Vo1 corresponding to the normal pixel circuit 11 is related to the contact capacitance Cf_1 corresponding to the normal pixel circuit 11, that is, the normal output signal Vo1 includes a fingerprint signal (namely a small signal component ΔVo1). On the other hand, the dummy output signal Vo2 corresponding to the dummy pixel circuit 12 is used to counteract the signal component in the normal output signal Vo1 which is influenced by parasitic capacitance, temperature and noise, and the dummy output signal Vo2 does not include the fingerprint signal (that is, the contact capacitance Cf_2 corresponding to the dummy pixel circuit 12 has no influence on the dummy output signal Vo2). The difference (Vo1−Vo2) between the normal output signal Vo1 and the dummy output signal Vo2 is amplified by the fingerprint identification system 10 using the differential amplifier circuit DAmp, that is, the fingerprint signal is amplified for the subsequent signal processing.

In addition, as shown in FIG. 2, the normal sensing circuit 115 includes an integration circuit 1150 and a calibration circuit 1152. The integration circuit 1150 includes an amplifier Amp1 and an integration capacitor CI1. The integration capacitor CI1 is coupled between a negative input terminal (marked with "−") and an output terminal of the amplifier Amp1 (where the negative input terminal of the amplifier Amp1 is the integral input terminal of the integration circuit 1150), and the positive input terminal (marked with "+") of the amplifier Amp1 is used for receiving a voltage $V_{ref}$. The calibration circuit 1152 includes a calibration capacitor C1 and calibration switches S1 and S2. First terminals of the calibration switches S1 and S2 are coupled to the calibration capacitor C1, a second terminal of the calibration switch S1 is used for receiving a positive voltage $V_{DD}$, and a second terminal of the calibration switch S2 is used for receiving a first calibration voltage $V_{DAC}$.

The dummy sensing circuit 125 includes an integration circuit 1250 and calibration circuits 1252, 1254. Similarly, the integration circuit 1250 includes an amplifier Amp2 and an integration capacitor CI2. The integration capacitor CI2 is coupled between a negative input terminal (marked with "−") and an output terminal of the amplifier Amp2 (where the negative input terminal of the amplifier Amp2 is the integral input terminal of the integration circuit 1250), and the positive input terminal (marked with "+") of the amplifier Amp2 is used for receiving a voltage $V_{ref}$. The calibration circuits 1252, 1254 are similar to the calibration circuit 1152. The calibration circuit 1252 includes a calibration capacitor C2 and calibration switches S3, S4, and the calibration circuit 1254 includes a calibration capacitor C3 and calibration switches S5, S6. First terminals of the calibration switches S3 and S4 are coupled to the calibration capacitor C2, first terminals of the calibration switches S5 and S6 are coupled to the calibration capacitor C3, second terminals of the calibration switches S3 and S5 are used for receiving a positive voltage $V_{DD}$, a second terminal of the calibration switch S4 is used for receiving a first calibration voltage $V_{DAC}$, and a second terminal of the calibration switch S6 is used for receiving a second calibration voltage $V_{DAC}'$. The calibration switches S1, S3 and S5 may be controlled by a signal CK1, and the calibration switches S2, S4 and S6 may be controlled by a signal CK2.

In addition, the fingerprint identification system 10 further includes a calibration voltage generation circuit 14 coupled between the differential amplifier circuit DAmp and the normal sensing circuit 115 as well as between the differential amplifier circuit DAmp and the dummy sensing circuit 125, and the calibration voltage generation circuit 14 is used for generating the first calibration voltage $V_{DAC}$ and the second calibration voltage $V_{DAC}'$ based on the amplified output signal Vo. In order to prevent the amplifiers Amp1 and Amp2 or the differential amplifier circuit DAmp from entering a saturation state, the calibration circuits 1152, 1252 and 1254 may be used for calibrating the normal output signal Vo1 and the dummy output signal Vo2 so that the normal output signal Vo1 is maintained in a specific range RG1 and the dummy output signal Vo2 is maintained in a specific range RG2.

In an embodiment, the first calibration voltage $V_{DAC}$ may be determined firstly by the calibration voltage generation circuit 14 to ensure that the voltage of the normal output signal Vo1 is within the specific range RG1, and then the second calibration voltage $V_{DAC}'$ is determined by the calibration voltage generation circuit 14 as appropriate so that the voltage of the dummy output signal Vo2 is within the specific range RG2. In other words, after the first calibration voltage VDAC is generated by the calibration voltage generation circuit 14, an output signal of the calibration circuit 1152 is applied to the integral input terminal of the integration circuit 1150 so that the voltage of the normal output signal Vo1 is raised by a calibration value ΔV1, and that the voltage of the normal output signal Vo1 is within the specific range RG1. Meanwhile, an output signal of the calibration circuit 1252 is applied to the integral input terminal of the integration circuit 1250 so that the voltage of the dummy output signal Vo2 is likewise raised by a calibration value ΔV2. If the voltage of the dummy output signal Vo2 is still outside the specific range RG2, the second calibration voltage $V_{DAC}'$ may be also generated by the calibration voltage generation circuit 14. An output signal generated by the calibration circuit 1254 according to the positive voltage $V_{DD}$ and the second calibration voltage $V_{DAC}'$ is applied to the integral input terminal of the integration circuit 1250 so that the voltage of the dummy output signal Vo2 is again raised by a calibration value ΔV3, and that the voltage of the dummy output signal Vo2 is within the specific range RG2. In other words, a coarse tune calibration is performed by the fingerprint identification system 10 on the dummy output signal Vo2 using the calibration circuit 1252, and a fine tune calibration is performed on the dummy output signal Vo2 using the calibration circuit 1254; that is, the calibration value ΔV2 is greater than the calibration value ΔV3. In order to make the calibration value ΔV2 be greater than the calibration value ΔV3, the capacitance value of the calibration capacitor C2 may be selected to be greater than the capacitance value of the calibration capacitor C3 in an embodiment. For example, the capacitance value of the calibration capacitor C2 may be greater than 8 times that of the calibration capacitor C3. For example, the capacitance value of the calibration capacitor C2 may be 25 times that of the calibration capacitor C3.

In addition, there is no limitation on the circuit structures of the normal pixel circuit 11 and the dummy pixel circuit 12. For example, as shown in FIG. 1, the normal pixel circuit 11 may include a contact layer 110, a shielding layer 112, and a driving circuit 113, and both the contact layer 110 and the shielding layer 112 are metal layers in the layout of the integrated circuit. The contact layer 110 is a top metal layer for receiving contact of a finger FG, and it forms a contact capacitance Cf_1 with the finger FG. The shielding layer 112 may be a lower metal layer next to the top metal layer, that is, the shielding layer 112 is disposed directly under the contact layer 110 and used for generating a shielding effect on the circuits under the shielding layer 112 so as to prevent the contact layer 110 from being interfered by the circuits under the shielding layer 112. The shielding layer 112A forms a parasitic capacitance Cp_1 with the contact layer 110. In addition, the contact layer 110 is coupled to the normal sensing circuit 115. The normal output signal Vo1 is related to the contact capacitance Cf_1 and the parasitic capacitance Cp_1. The normal output signal Vo1 may be expressed as Vo1=A*($\overline{Cf\_1}$+ΔCf_1)+B*Cp_1+D, where A, B, and D represent parameters related to the positive voltage $V_{DD}$ or the driving circuit and the voltage generated by the driving circuit, and $\overline{Cf\_1}$ may represent an average value of a plurality of contact capacitances formed by the plurality of pixel circuits. In addition, the parameters A, B, and D may be changed due to the influence of temperature or noise.

On the other hand, the dummy pixel circuit 12 may include a contact layer 120, a shielding layer 122, metal layers 124 and 126, a driving circuit 121, and a driving circuit 123. The contact layer 120, the shielding layer 122, and the metal layers 124 and 126 all are metal layers in the layout of the integrated circuit. The contact layer 120 is a top metal layer for receiving contact of the finger FG, and it forms a contact capacitance Cf_2 with the finger FG. The shielding layer 122 may be a lower metal layer next to the top metal layer, that is, the shielding layer 122 is disposed directly under the contact layer 120 and used for generating a shielding effect on the circuits under the shielding layer 122 so as to prevent the contact layer 120 from being interfered by the circuits under the shielding layer 122. The shielding layer 122 forms a parasitic capacitance Cp_2 with the contact layer 120. In addition, the metal layer 124 may be a lower metal layer next to the shielding layer 122 (that is, the metal layer 124 may be disposed/arranged under the shielding layer 122), and the metal layer 126 may be a lower metal layer next to the metal layer 124 (that is, the metal layer 126 may be disposed/arranged under the metal layer 124). The metal layer 124 forms a parasitic capacitance Cp_3 with the metal layer 126. The contact layer 120 is coupled to the driving circuit 121. The metal layer 124 is coupled to the driving circuit 123. The shielding layer 122 and the metal layer 126 are coupled to the driving circuit 123. In addition, the dummy sensing circuit 125 is coupled to the metal layer 124.

It should be noted that the second sensing circuit 125 is not connected to the contact layer 120. Therefore, the contact capacitance Cf_2 (and the parasitic capacitance Cp_2) has no influence on the dummy output signal Vo2. The dummy output signal Vo2 may be expressed as Vo2=E*Cp_3+F, where E, F represent parameters related to the positive voltage $V_{DD}$ or the driving circuit, and the parameters E, F may be changed due to the influence of temperature or noise.

In addition, the dummy pixel circuit 12 may be designed appropriately such that E*Cp_3+F=A*$\overline{Cf\_1}$+B*Cp_1+D, that is, the dummy output signal Vo2 is equal to the large signal component $\overline{V_{o1}}$ of the normal output signal Vo1 (Vo2=$\overline{V_{o1}}$). In this way, only the fingerprint signal (namely, the small signal component ΔVo1, where ΔVo1=Vo1−Vo2=A*ΔCf_1) may be amplified by the differential amplifier circuit DAmp, that is, the amplified output signal VO may be expressed as VO=Av*(Vo1−Vo2)=Av*ΔVo1, where Av represents a gain of the differential amplifier circuit DAmp. In this way, it can be determined by the back-end circuit of the fingerprint identification system 10 whether the normal pixel circuit 11 corresponds to a finger ridge or a finger valley of the finger FG according to the amplified output signal VO.

It should be noted that in the normal output signal Vo1, the parameters A, B, and D may be changed due to the influence of temperature or noise, whereas in the dummy output signal Vo2, the parameters E, F may also be changed due to the influence of temperature or noise. That is, the signal component in the normal output signal Vo1 which is influenced by temperature or noise can be eliminated using the differential amplifier circuit DAmp (by subtracting the dummy output signal Vo2 from the normal output signal Vo1), and only the fingerprint signal related to the variation value ΔCf_1 of the contact capacitance is amplified by the differential amplifier circuit DAmp so as to increase the fingerprint identification accuracy of the fingerprint identification system 10.

As can be seen from the above description, the fingerprint identification system 10 further includes the dummy pixel circuit 12 in addition to the normal pixel circuit 11. The dummy output signal Vo2 is generated by the dummy pixel circuit 12 to counteract signal components in the output signals of the plurality of normal pixel circuits which are influenced by the parasitic capacitance, temperature and noise. The amplification and subsequent signal processing are performed on the fingerprint signal components (small signal component ΔVo1, ΔVo1=A*ΔCf_1) in the output signals of the plurality of normal pixel circuits to determine whether the fingerprint is a finger ridge or a finger valley of the finger FG. In addition, the coarse tune calibration and fine tune calibration are performed by the fingerprint identification system 10 on the dummy output signal Vo2 using the calibration circuit 1252 and the calibration circuit 1254 respectively so that the voltage of the dummy output signal Vo2 is within the specific range RG2.

Figure 3:
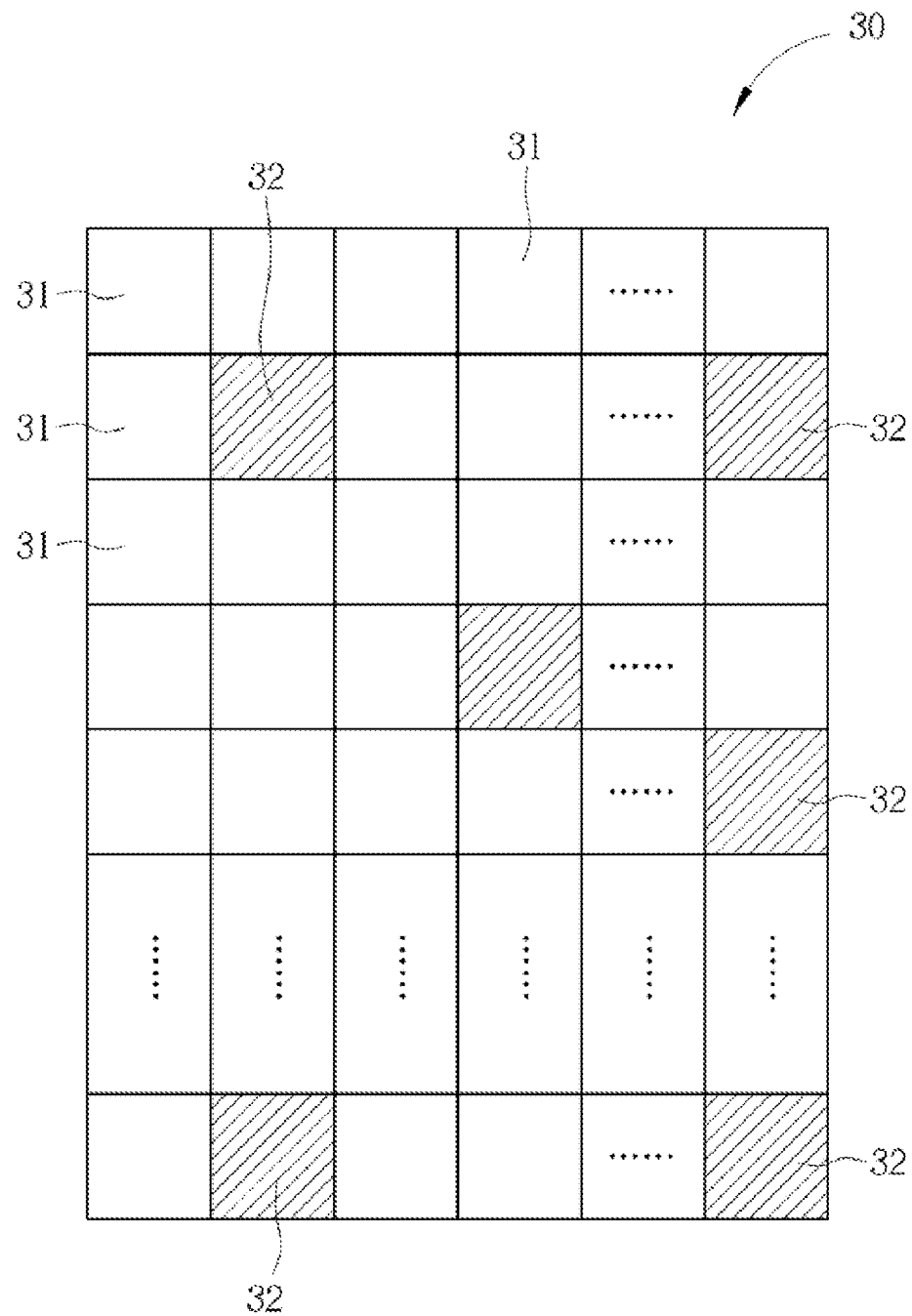
FIG. 3 is a schematic top view of a fingerprint identification system according to an embodiment of the present disclosure.

In addition, there is no limitation on the normal pixel circuit and the dummy pixel circuit in the fingerprint identification system of the present disclosure. Reference is made to FIG. 3, which is a schematic top view of a fingerprint identification system 30 according to an embodiment of the present disclosure. As shown in FIG. 3, the fingerprint identification system 30 includes a plurality of normal pixel circuits 31 and a plurality of dummy pixel circuits 32 arranged in an array, and the plurality of dummy pixel circuits 32 may be arranged in the array in a random manner. It should be noted that the arrangement of the plurality of normal pixel circuits 31 and the plurality of dummy pixel circuits 32 shown in FIG. 3 is only an embodiment, and the plurality of dummy pixel circuits may be arranged in the periphery of the array, or may also be arranged in a row or a column of the array. There is no limitation on the arrangement herein.

Figure 4:
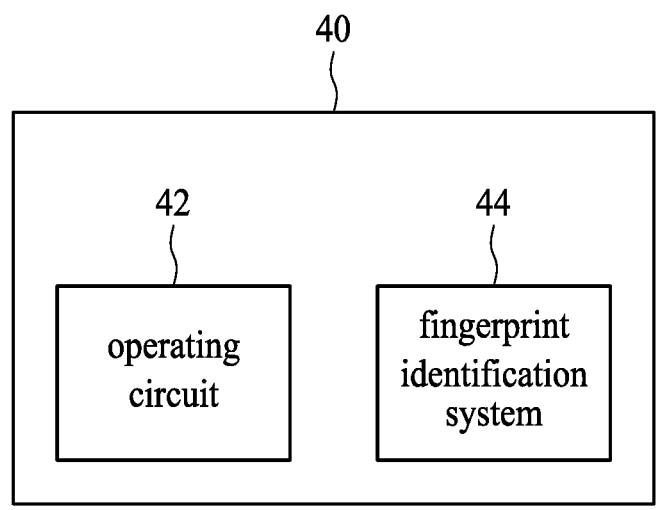
FIG. 4 is a schematic diagram of an electronic device according to an embodiment of the present disclosure.

In addition, the fingerprint identification system of the present disclosure may be applied to an electronic device. Reference is made to FIG. 3, which is a schematic diagram of an electronic device according to an embodiment of the present disclosure. The electronic device 40 may be a tablet computer or a smart phone. As shown in FIG. 4, the electronic device 40 includes an operating circuit 42 and a fingerprint identification system 44. The fingerprint identification system 44 is coupled to the operating circuit 42, and it can be implemented by the fingerprint identification system 10. In addition, the operating circuit 42 may include a processor and a storage device, and the storage device may be a read-only memory (ROM), a random-access memory (RAM), a non-volatile memory (such as an electrically erasable programmable read-only memory (EEPROM) or a flash memory).

Is summary, according to the disclosure, the dummy output signal is generated by the dummy pixel circuit to counteract the signal components in the output signal of the normal pixel circuit which are influenced by parasitic capacitance, temperature and noise. The amplification and subsequent signal processing are performed on the fingerprint signal in the output signal of the normal pixel circuit to increase the accuracy of fingerprint identification. In addition, according to the present disclosure, the coarse tune calibration and fine tune calibration are performed on the dummy output signal using two calibration circuits respectively so that the voltage of the dummy output signal is within the specific range.

The above description merely relates to some embodiments of the present disclosure and is not intended to limit the present disclosure. Any change, equivalent substitution, improvements or the like made within the spirit and principles of the present disclosure should be considered as falling within the scope of protection of the present disclosure.

What is claimed is:

1. A fingerprint identification system, comprising:
a first pixel circuit, including a contact layer and a shielding layer, wherein the contact layer is over the shielding layer and form a first parasitic capacitance;
a first sensing circuit, coupled to the contact layer of the first pixel circuit, the first sensing circuit being used for sensing a contact capacitance due to finger contact and outputting a first output signal;
a second pixel circuit, including, from top to bottom, a contact layer, a shielding layer, a first metal layer and a second metal layer, wherein the contact layer and the shielding layer of the second pixel circuit form a second parasitic capacitance, and the first metal and the second metal form a third parasitic capacitance;
a second sensing circuit, coupled to the first metal layer of the second pixel circuit, the second sensing circuit being used for outputting a second output signal, wherein the first output signal is related to the first parasitic capacitance and unrelated to the third parasitic capacitance; and the second output signal is related to the third parasitic capacitance and unrelated to the second parasitic capacitance; and
a differential amplifier circuit, coupled to the first sensing circuit and the second sensing circuit, the differential amplifier circuit being used for amplifying a difference between the first output signal and the second output signal to generate an amplified output signal.

2. The fingerprint identification system of claim 1, wherein
the first sensing circuit comprises:
a first integration circuit, having a first integral input terminal; and
a first calibration circuit, coupled to the first integral input terminal, the first calibration circuit being used for calibrating the first output signal;
the second sensing circuit comprises:
a second integration circuit, having a second integral input terminal;
a second calibration circuit, coupled to the second integral input terminal; and
a third calibration circuit, coupled to the second integral input terminal, wherein the second calibration circuit and the third calibration circuit are used for calibrating the second output signal; and
wherein the first calibration circuit comprises:
a first calibration capacitor, coupled to the first integral input terminal;
a first calibration switch, one terminal of the first calibration switch being coupled to the first calibration capacitor, and another terminal of the first calibration switch being coupled to a positive voltage; and
a second calibration switch, one terminal of the second calibration switch being coupled to the first calibration capacitor, and another terminal of the second calibration switch being for receiving a first calibration voltage.

3. The fingerprint identification system of claim 2, wherein the second calibration circuit comprises:
a second calibration capacitor, coupled to the second integral input terminal;
a third calibration switch, one terminal of the third calibration switch being coupled to the second calibration capacitor, and another terminal of the third calibration switch being coupled to the positive voltage; and
a fourth calibration switch, one terminal of the fourth calibration switch being coupled to the second calibration capacitor, and another terminal of the fourth calibration switch being for receiving the first calibration voltage.

4. The fingerprint identification system of claim 2, wherein the third calibration circuit comprises:
a third calibration capacitor, coupled to the second integral input terminal;
a fifth calibration switch, one terminal of the fifth calibration switch being coupled to the third calibration capacitor, and another terminal of the fifth calibration switch being coupled to the positive voltage; and
a sixth calibration switch, one terminal of the sixth calibration switch being coupled to the third calibration capacitor, and another terminal of the sixth calibration switch being for receiving a second calibration voltage.

5. The fingerprint identification system of claim 4, wherein capacitance of the second calibration capacitor is greater than capacitance of the third calibration capacitor.

6. The fingerprint identification system of claim 4, wherein the capacitance of the second calibration capacitor is 25 times the capacitance of the third calibration capacitor.

7. The fingerprint identification system of claim 4, further comprising a calibration voltage generation circuit, coupled to the differential amplifier circuit, the first sensing circuit and the second sensing circuit, the calibration voltage generation circuit being used for generating the first calibration voltage and the second calibration voltage based on the amplified output signal.

8. The fingerprint identification system of claim 1, wherein the first integration circuit comprises:
a first amplifier, coupled to the first integral input terminal; and
a first integration capacitor, coupled between the first integral input terminal and a first output terminal of the first amplifier.

9. The fingerprint identification system of claim 1, wherein the second integration circuit comprises:
a second amplifier, coupled to the second integral input terminal; and
a second integration capacitor, coupled between the second integral input terminal and a second output terminal of the second amplifier.

10. The fingerprint identification system of claim 1, wherein the first output signal includes a first calibration amount due to the first calibration circuit, the second output signal includes a second calibration amount due to the second calibration circuit, the second output signal includes a third calibration amount due to the third calibration circuit, and the second calibration amount is greater than the third calibration amount.

11. An electronic device, comprising:
an operating circuit; and
a fingerprint identification system, which comprises:
a first pixel circuit, including a contact layer and a shielding layer, wherein the contact layer is over the shielding layer and form a first parasitic capacitance;
a first sensing circuit, coupled to the contact layer of the first pixel circuit, the first sensing circuit being used for sensing a contact capacitance due to finger contact and outputting a first output signal;
a second pixel circuit, including, from top to bottom, a contact layer, a shielding layer, a first metal layer and a second metal layer, wherein the contact layer and the shielding layer of the second pixel circuit form a second parasitic capacitance, and the first metal and the second metal form a third parasitic capacitance;
a second sensing circuit, coupled to the first metal layer of the second pixel circuit, the second sensing circuit being used for outputting a second output signal, wherein the first output signal is related to the first parasitic capacitance and unrelated to the third parasitic capacitance; and the second output signal is related to the third parasitic capacitance and unrelated to the second parasitic capacitance; and
a differential amplifier circuit, coupled to the first sensing circuit and the second sensing circuit, the differential amplifier circuit being used for amplifying a difference between the first output signal and the second output signal to generate an amplified output signal.

12. The electronic device of claim 11, wherein the first sensing circuit comprises:
a first integration circuit, having a first integral input terminal; and
a first calibration circuit, coupled to the first integral input terminal, the first calibration circuit being used for calibrating the first output signal;
wherein the second sensing circuit comprises:
a second integration circuit, having a second integral input terminal;
a second calibration circuit, coupled to the second integral input terminal; and
a third calibration circuit, coupled to the second integral input terminal, wherein the second calibration circuit and the third calibration circuit are used for calibrating the second output signal.

13. The electronic device of claim 12, wherein the first calibration circuit comprises:
a first calibration capacitor, coupled to the first integral input terminal;
a first calibration switch, one terminal of the first calibration switch being coupled to the first calibration capacitor, and another terminal of the first calibration switch being coupled to a positive voltage; and
a second calibration switch, one terminal of the second calibration switch being coupled to the first calibration capacitor, and another terminal of the second calibration switch being for receiving a first calibration voltage.

14. The electronic device of claim 13, wherein the second calibration circuit comprises:
a second calibration capacitor, coupled to the second integral input terminal;
a third calibration switch, one terminal of the third calibration switch being coupled to the second calibration capacitor, and another terminal of the third calibration switch being coupled to the positive voltage; and
a fourth calibration switch, one terminal of the fourth calibration switch being coupled to the second calibration capacitor, and another terminal of the fourth calibration switch being for receiving the first calibration voltage.

15. The electronic device of claim 13, wherein the third calibration circuit comprises:
a third calibration capacitor, coupled to the second integral input terminal;
a fifth calibration switch, one terminal of the fifth calibration switch being coupled to the third calibration capacitor, and another terminal of the fifth calibration switch being coupled to the positive voltage; and
a sixth calibration switch, one terminal of the sixth calibration switch being coupled to the third calibration capacitor, and another terminal of the sixth calibration switch being for receiving a second calibration voltage.

16. The electronic device of claim 15, wherein capacitance of the second calibration capacitor is greater than capacitance of the third calibration capacitor.

17. The electronic device of claim 15, wherein the capacitance of the second calibration capacitor is 25 times the capacitance of the third calibration capacitor.

18. The electronic device of claim 15, further comprising a calibration voltage generation circuit, coupled to the differential amplifier circuit, the first sensing circuit and the second sensing circuit, the calibration voltage generation circuit being used for generating the first calibration voltage and the second calibration voltage based on the amplified output signal.

19. The electronic device of claim 12, wherein the first integration circuit comprises:

a first amplifier, coupled to the first integral input terminal; and a first integration capacitor, coupled between the first integral input terminal and a first output terminal of the first amplifier.

20. The electronic device of claim 12, wherein the second integration circuit comprises:

a second amplifier, coupled to the second integral input terminal; and a second integration capacitor, coupled between the second integral input terminal and a second output terminal of the second amplifier.

* * * * *